(12) United States Patent　　(10) Patent No.: US 9,706,843 B2
Hung　　(45) Date of Patent: Jul. 18, 2017

(54) DISPLAY SUPPORT DEVICE HAVING A TIGHTENING UNIT

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/134,609

(22) Filed: Apr. 21, 2016

(65) Prior Publication Data

US 2017/0150817 A1　Jun. 1, 2017

(30) Foreign Application Priority Data

Dec. 1, 2015　(TW) .............................. 104219243 U

(51) Int. Cl.
　　*F16M 13/02*　　(2006.01)
　　*A47B 97/00*　　(2006.01)

(52) U.S. Cl.
　　CPC ........... *A47B 97/001* (2013.01); *F16M 13/02* (2013.01); *F16M 2200/022* (2013.01); *F16M 2200/06* (2013.01)

(58) Field of Classification Search
　　CPC .... F16M 11/2014; F16M 11/10; F16M 11/22; F16M 13/02; F16M 2200/022; F16M 2200/06; A47B 97/04; A47B 2097/005; A47B 97/001
　　USPC .... 248/118, 121, 122.1, 124.1, 125.1, 274.1, 248/276.1, 278.1, 280.11, 282.1, 284.1; 348/825
　　See application file for complete search history.

(56) References Cited

U.S. PATENT DOCUMENTS 999,283 A * 8/1911 White ................... F16M 13/02
　　　　　　　　　　　　　　　　　　248/282.1
4,266,747 A * 5/1981 Souder, Jr. ............ F16M 11/14
　　　　　　　　　　　　　　　　　　248/123.11
4,447,031 A * 5/1984 Souder, Jr. ........... F16M 11/126
　　　　　　　　　　　　　　　　　　248/281.11
4,846,434 A * 7/1989 Krogsrud ............... F16M 11/10
　　　　　　　　　　　　　　　　　　248/123.11
5,505,424 A * 4/1996 Niemann ............... F16M 11/14
　　　　　　　　　　　　　　　　　　248/288.31
5,975,472 A * 11/1999 Hung ................... F16M 11/105
　　　　　　　　　　　　　　　　　　248/278.1
7,188,812 B2 * 3/2007 Wang ................. F16M 11/2064
　　　　　　　　　　　　　　　　　　248/276.1
7,207,537 B2 * 4/2007 Hung .................... F16M 11/10
　　　　　　　　　　　　　　　　　　248/274.1

(Continued)

*Primary Examiner* — Muhammad Ijaz
(74) *Attorney, Agent, or Firm* — Burris Law, PLLC

(57) ABSTRACT

A display support device includes a support arm, a carrier unit, a positioning unit and a tightening unit. The support arm includes an arm main body, and first and second first sleeve portions respectively pivoted to two opposite ends of the arm main body. The carrier unit includes a first rotary tube connected to the first sleeve portion. The positioning unit includes a second rotary tube connected to the second sleeve portion. The tightening unit includes a tightening tube sleeved on one of the first and second rotary tubes, and an adjustable member operable to move and extend through one of the first and second sleeve portions so as to tighten the tightening tube on the one of the first and second rotary tubes.

10 Claims, 15 Drawing Sheets

(56) References Cited

U.S. PATENT DOCUMENTS

| | | | | |
|---|---|---|---|---|
| 7,338,022 B2* | 3/2008 | Hung | F16M 11/041 248/278.1 |
| 7,395,995 B2* | 7/2008 | Chen | F16M 11/105 248/284.1 |
| 7,726,616 B2* | 6/2010 | Zhang | F16M 11/2021 248/284.1 |
| 8,070,114 B2* | 12/2011 | Chen | F16M 11/14 248/121 |
| 8,162,271 B2* | 4/2012 | Li | F16M 11/105 248/162.1 |
| 8,245,991 B2* | 8/2012 | Hung | F16M 11/2021 248/276.1 |
| 8,684,325 B1* | 4/2014 | Beshara | F16M 13/02 248/274.1 |
| 9,004,431 B2* | 4/2015 | Huang | F16M 11/10 248/121 |
| 9,033,292 B2* | 5/2015 | Lu | F16M 13/022 248/123.11 |
| 9,228,696 B2* | 1/2016 | Borloz | F16M 11/046 |
| 2004/0031894 A1* | 2/2004 | Smed | F16M 11/10 248/278.1 |
| 2004/0084587 A1* | 5/2004 | Oddsen | F16M 11/10 248/284.1 |
| 2004/0245419 A1* | 12/2004 | Sweere | F16M 11/105 248/276.1 |
| 2005/0230585 A1* | 10/2005 | Hung | F16M 11/10 248/278.1 |
| 2009/0008524 A1* | 1/2009 | Huang | F16M 11/10 248/278.1 |
| 2009/0134285 A1* | 5/2009 | Huang | F16M 11/08 248/124.1 |
| 2010/0019112 A1* | 1/2010 | Chi | F16M 11/2064 248/281.11 |
| 2011/0108689 A1* | 5/2011 | Dorris | F16M 11/041 248/221.12 |
| 2011/0147546 A1* | 6/2011 | Monsalve | F16M 11/041 248/122.1 |
| 2012/0132771 A1* | 5/2012 | Wang | F16M 11/2014 248/278.1 |
| 2012/0267497 A1* | 10/2012 | Bowman | F16M 11/10 248/280.11 |
| 2013/0021539 A1* | 1/2013 | Austin | F16M 11/125 348/836 |
| 2013/0161466 A1* | 6/2013 | Lau | F16M 13/02 248/288.11 |
| 2013/0299658 A1* | 11/2013 | Hung | F16M 13/02 248/276.1 |
| 2014/0367137 A1* | 12/2014 | Leung | H02G 3/045 174/68.3 |

* cited by examiner

DISPLAY SUPPORT DEVICE HAVING A TIGHTENING UNIT

CROSS-REFERENCE TO RELATED APPLICATION

This application claims priority to Taiwanese Patent Application No. 104219243, filed on Dec. 1, 2015.

FIELD

The disclosure relates to a support device, and more particularly to a display support device having a tightening unit.

BACKGROUND

A conventional display support device, as disclosed in Taiwanese Utility Model Patent Publication No. M393137, includes a support arm having first and second joint members, a display mounting seat rotatably inserted into the first joint member, an extension arm rotatably connected to the second joint member, and a fixing seat connected to the extension arm. However, the display mounting seat and the extension arm are easily moved with respect to the first and second joint members in the presence of an external force, thereby causing the display to deviate from a position required by a user. That is, the conventional display support device cannot precisely lock the position of the display as desired.

SUMMARY

Therefore, an object of the present disclosure is to provide a display support device that can alleviate the drawback of the prior art.

According to the present disclosure, a display support device includes a support arm, a carrier unit, a positioning unit and a tightening unit. The support arm includes an arm main body, and first and second joint members respectively pivoted to two opposite ends of the arm main body. The first joint member has a first pivot portion pivoted to one of the opposite ends of the arm main body, and a first sleeve portion connected to the first pivot portion. The second joint member has a second pivot portion pivoted to the other one of the opposite ends of the arm main body, and a second sleeve portion connected to the second pivot portion. The carrier unit includes a first rotary tube rotatably connected to the first sleeve portion, and a display mounting seat connected to the first rotary tube at a position opposite to the first joint member.

The positioning unit includes a second rotary tube rotatably connected to the second sleeve portion, and a fixing seat connected to the second rotary tube at a position opposite to the second joint member. The tightening unit includes a tightening tube sleeved on an outer peripheral surface of one of the first and second rotary tubes, and an adjustable member adjustably connected to one of the first and second sleeve portions. The tightening tube has an inner surrounding surface contacting with the outer peripheral surface of the one of the first and second rotary tubes, an outer surrounding surface opposite to the inner surrounding surface, and a slit formed through the inner and outer surrounding surfaces and extending along the length of the tightening tube. The adjustable member is operable to move and extend through the one of the first and second sleeve portions so as to push the outer surrounding surface of the tightening tube and adjust a width of the slit, thereby tightening the tightening tube on the outer peripheral surface of the one of the first and second rotary tubes.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
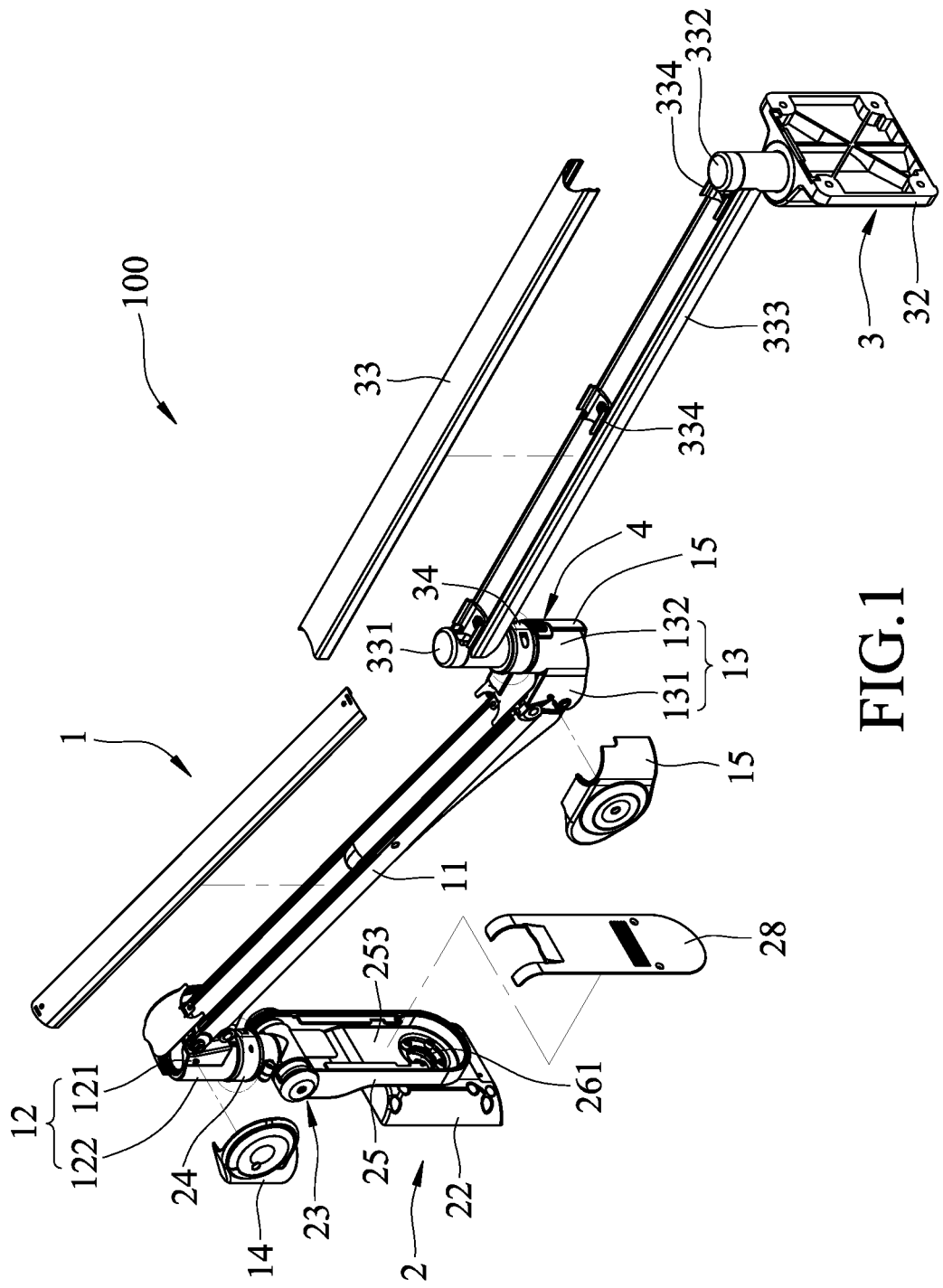
FIG. 1 is an exploded perspective view of a display support device according to a first embodiment of the present disclosure.
Figure 2:
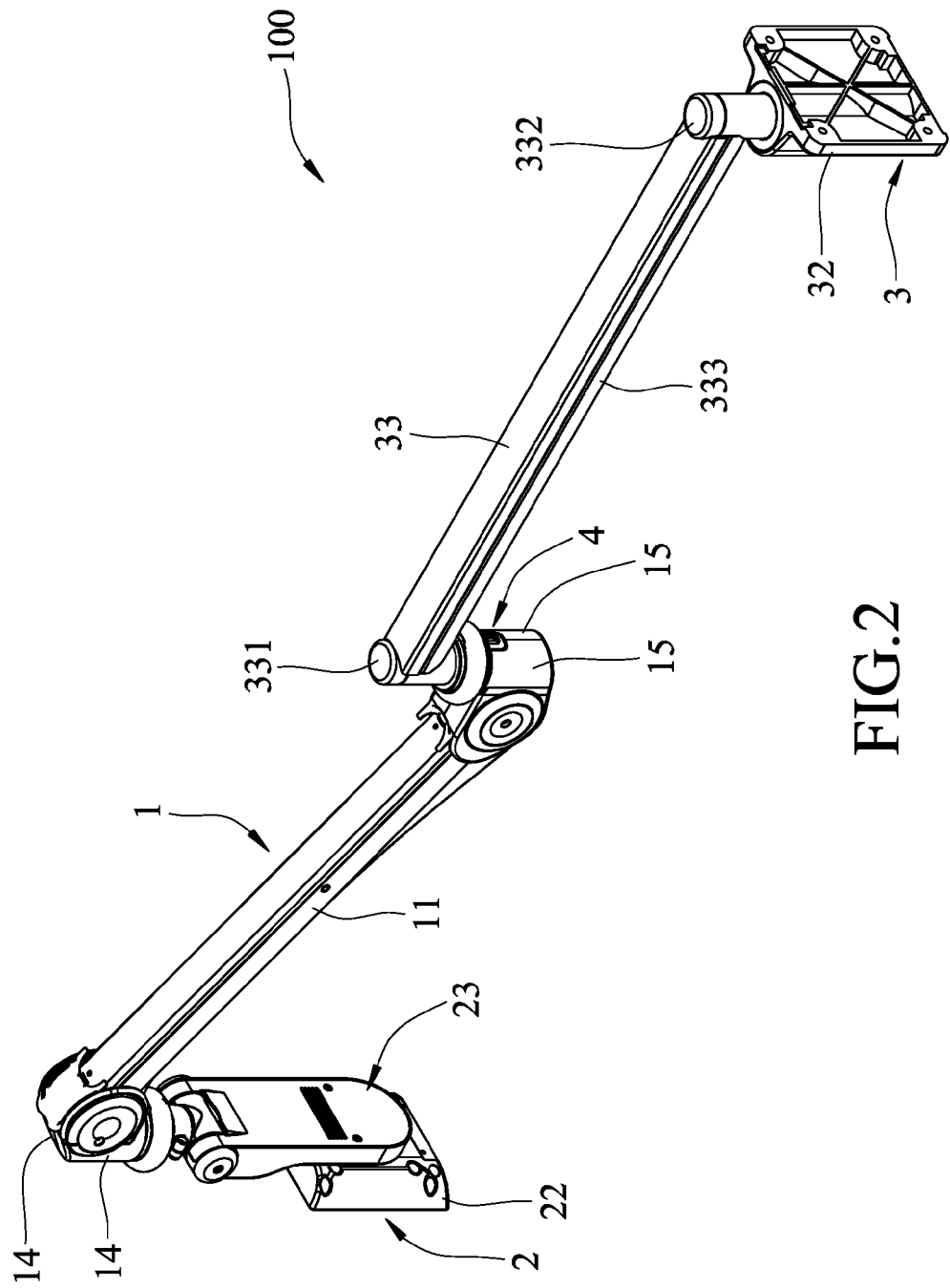
FIG. 2 is an assembled perspective view of the first embodiment.
Figure 3:
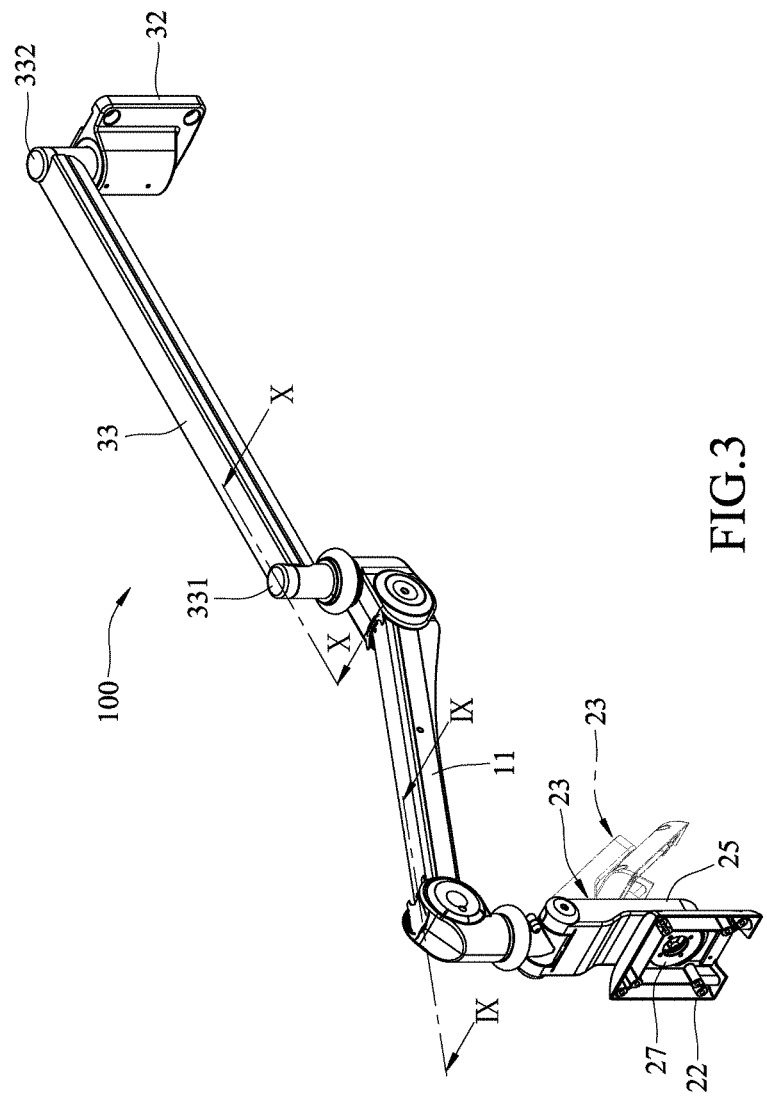
FIG. 3 is another assembled perspective view of the first embodiment taken from another angle.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 5, a display support device 100 according to a first embodiment of the present disclosure includes a support arm 1, a carrier unit 2, a positioning unit 3 and a tightening unit 4.

Figure 8:
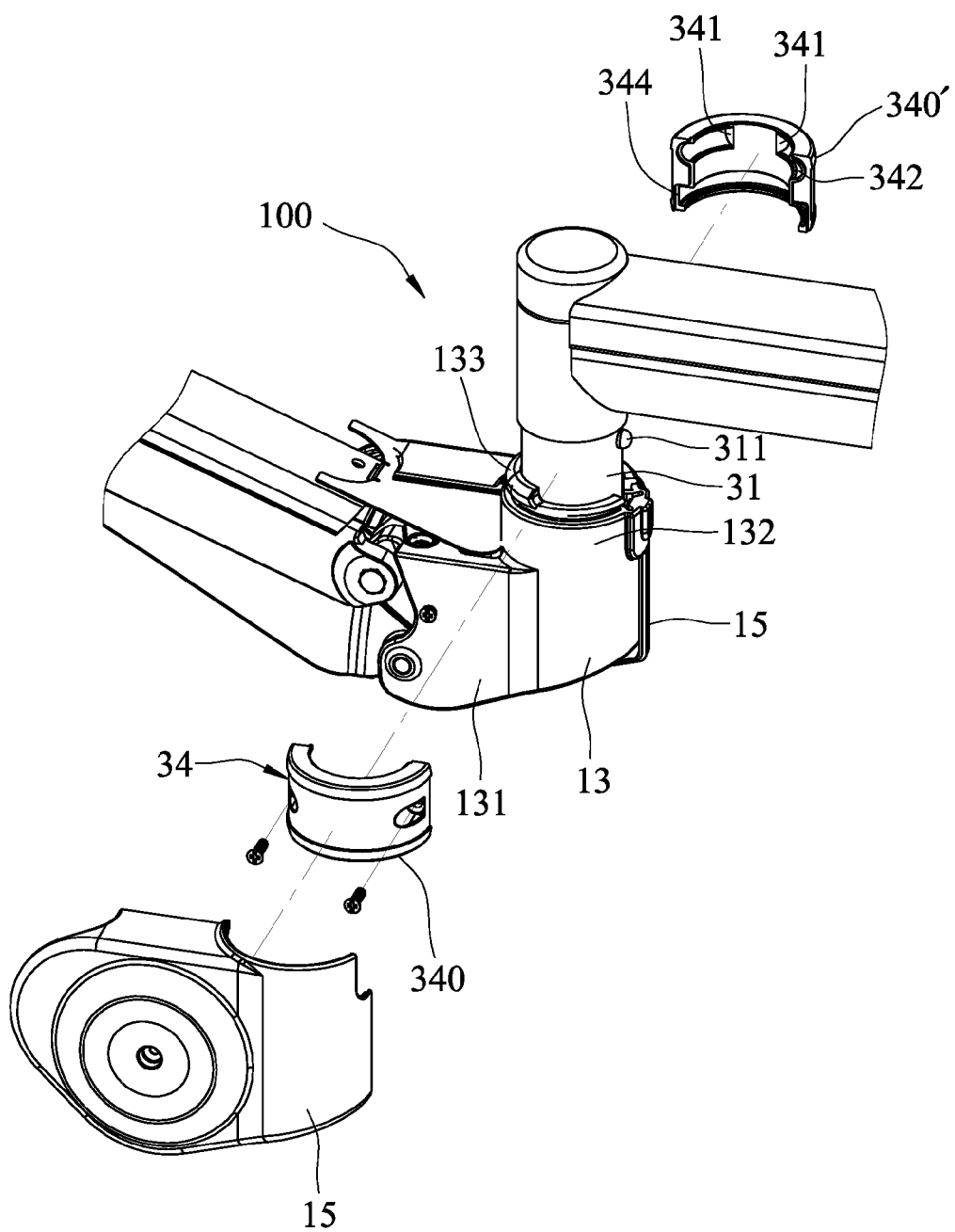
FIG. 8 is another fragmentary partly exploded perspective view of the first embodiment, illustrating a second rotary ring having a second limiting groove.
Figure 9:
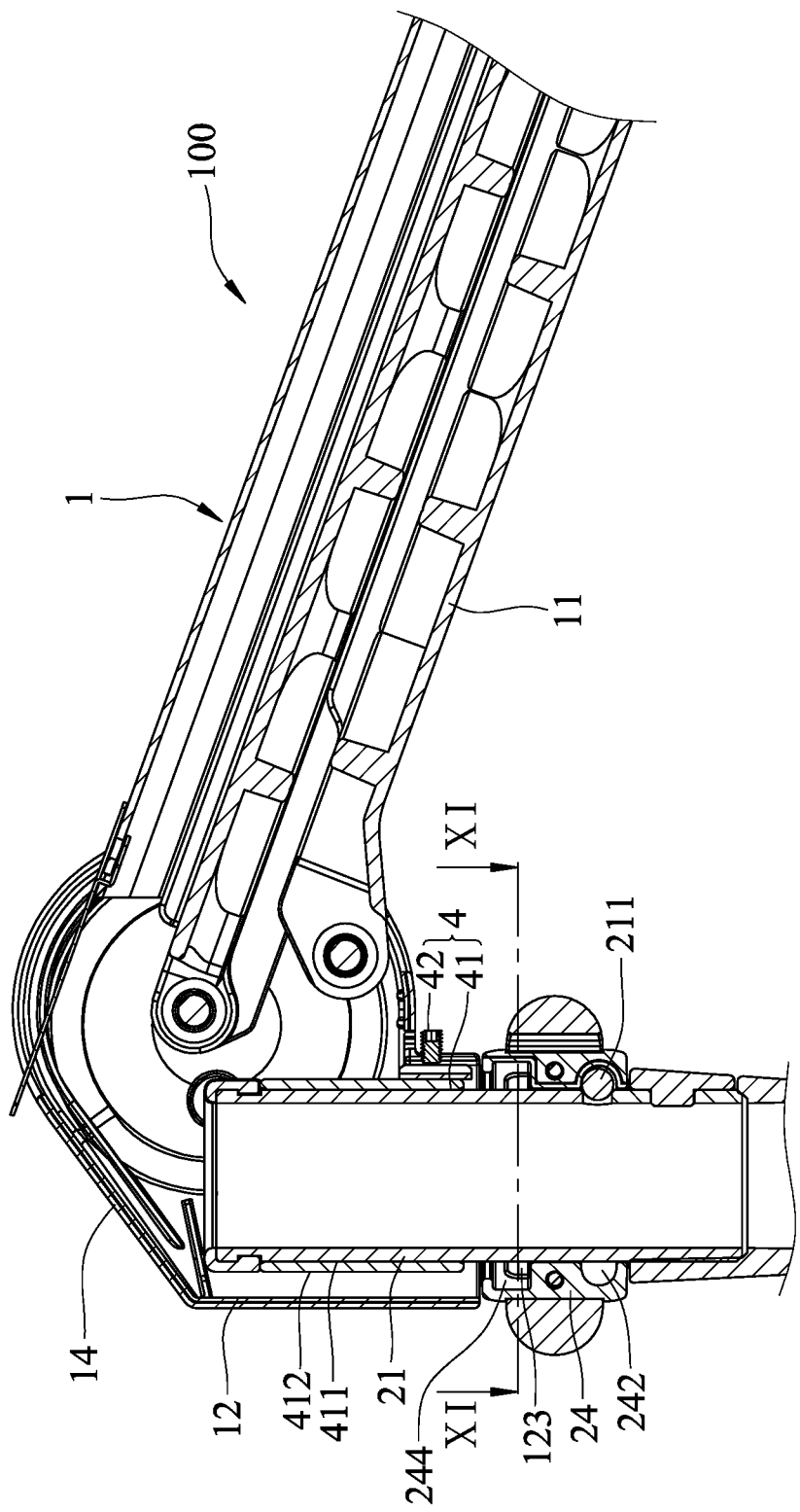
FIG. 9 is a sectional view of the first embodiment taken along line IX-IX of FIG. 3.
Figure 10:
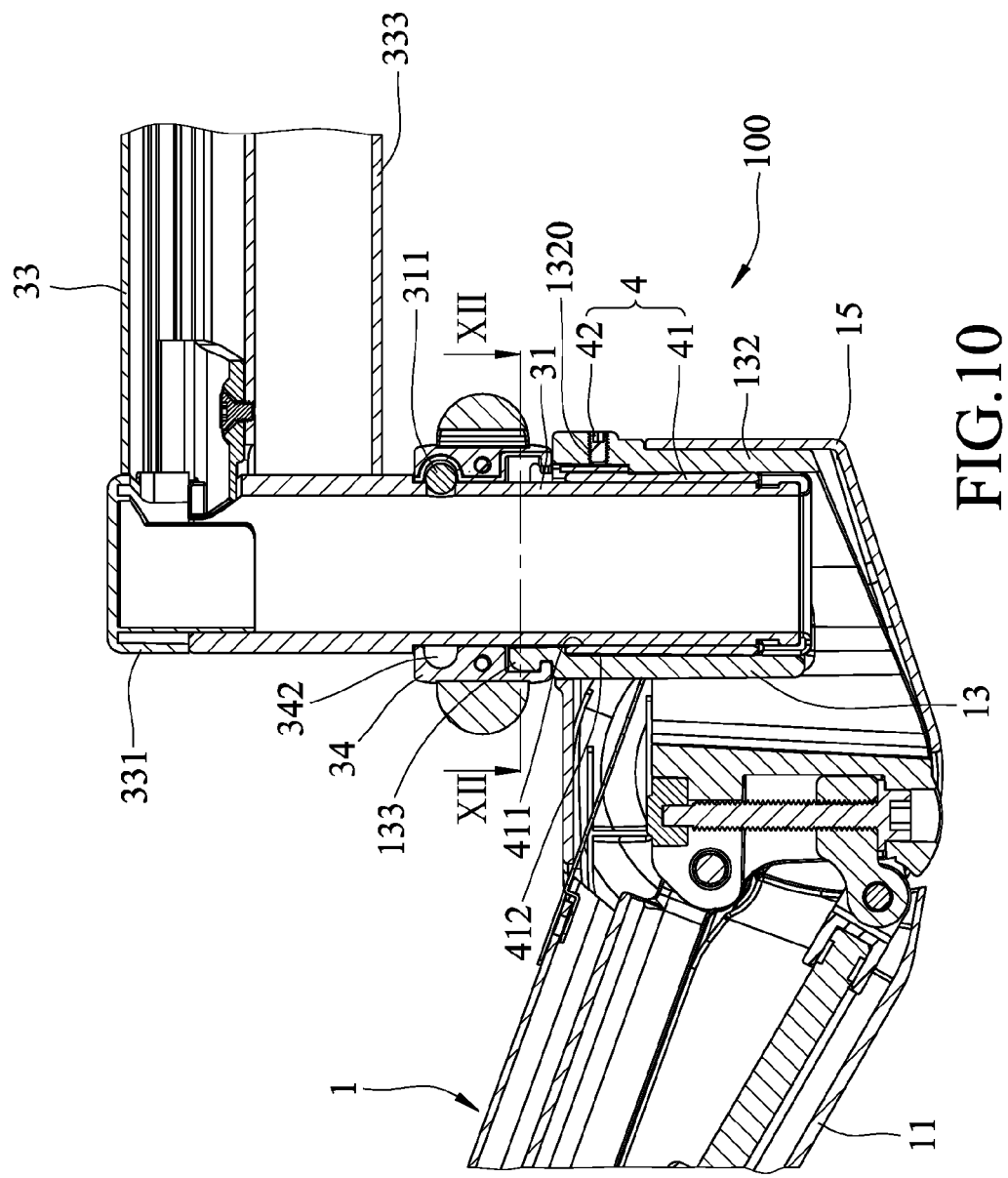
FIG. 10 a sectional view of the first embodiment taken along line X-X of FIG. 3.
Figure 11:
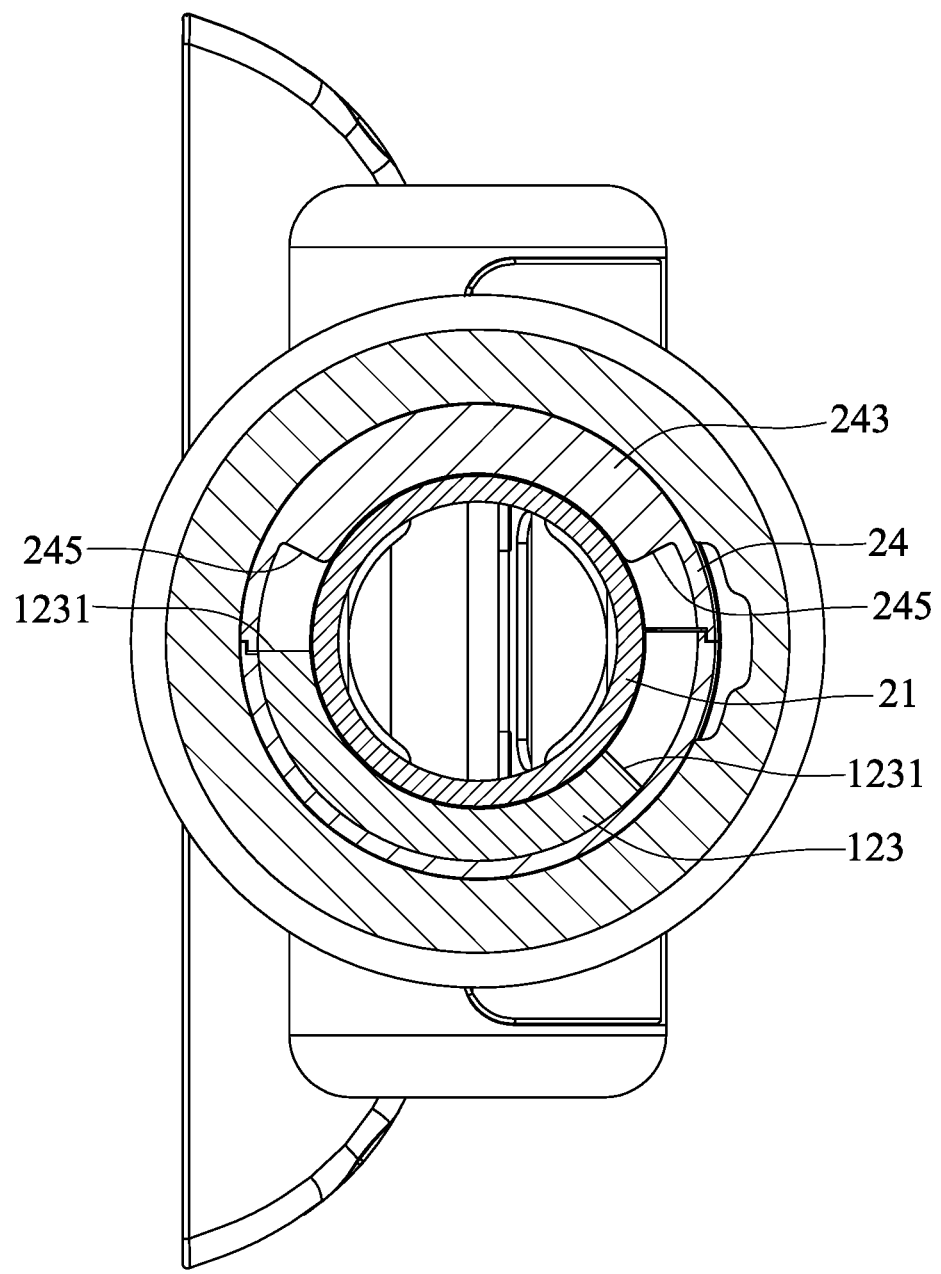
FIG. 11 is a sectional view of the first embodiment taken along line XI-XI of FIG. 9.
Figure 12:
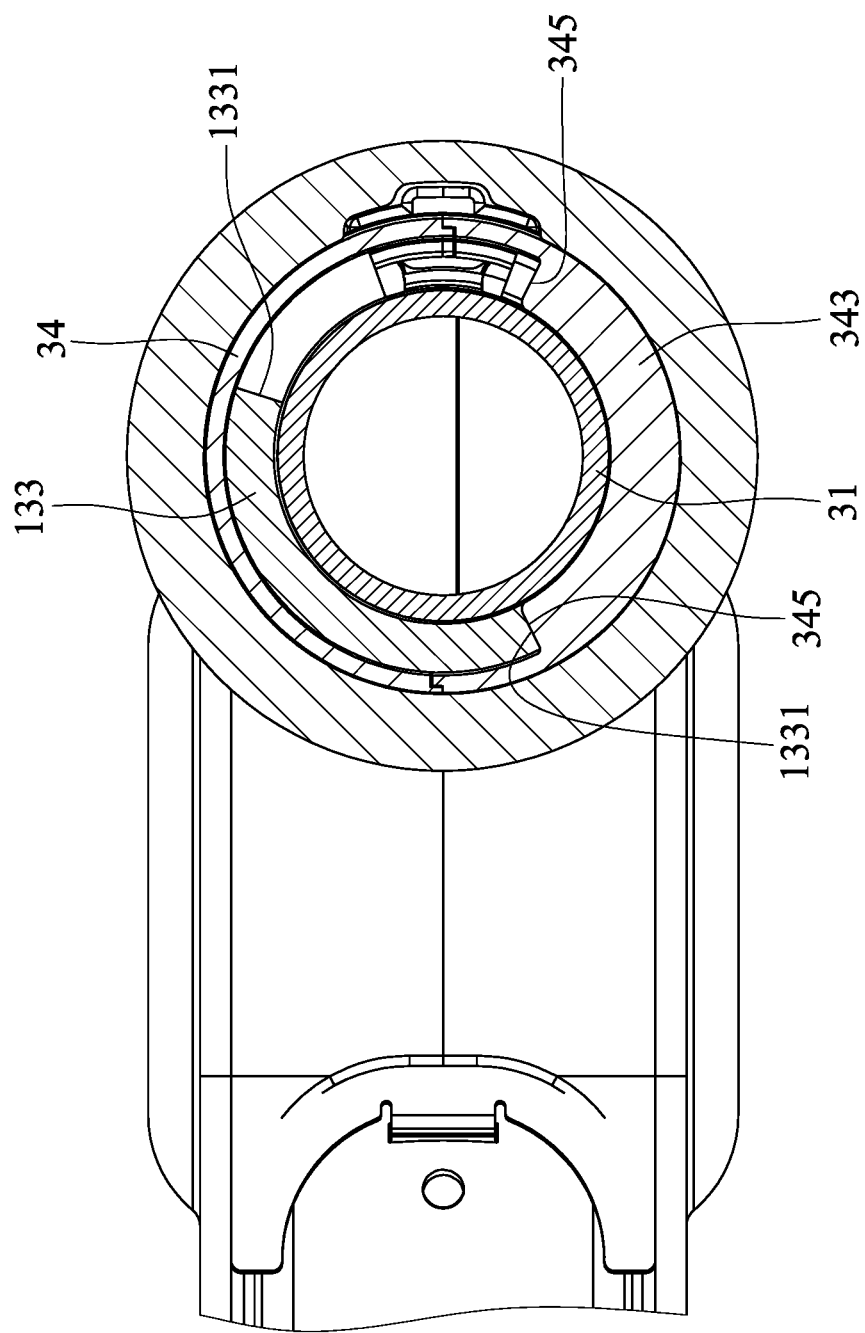
FIG. 12 is a sectional view of the first embodiment taken along line XII-XII of FIG. 10.

The support arm 1 includes an arm main body 11, and first and second joint members 12, 13 respectively pivoted to two opposite ends of the arm main body 11. The first joint member 12 has a first pivot portion 121 pivoted to one of the opposite ends of the arm main body 11, a first sleeve portion 122 fixed to the first pivot portion 121, and an arcuate first stopper 123 connected to a lower end of the first sleeve portion 122. The first stopper 123 has two angularly spaced-apart stop edges 1231. The second joint member 13 has a second pivot portion 131 pivoted to the other opposite end of the arm main body 11, a second sleeve portion 132 fixed to the second pivot portion 131, and an arcuate second stopper 133 (see FIG. 8) connected to an upper end of the second sleeve portion 132. The second stopper 133 has two angularly spaced-apart stop edges 1331 (see FIG. 12). The structures of the first and second joint members 12, 13 are generally the same. In this embodiment, the first joint member 12 is covered by two removably connectable first casings 14, and the second joint member 13 is covered by two removably connectable second casings 15.

Figure 4:
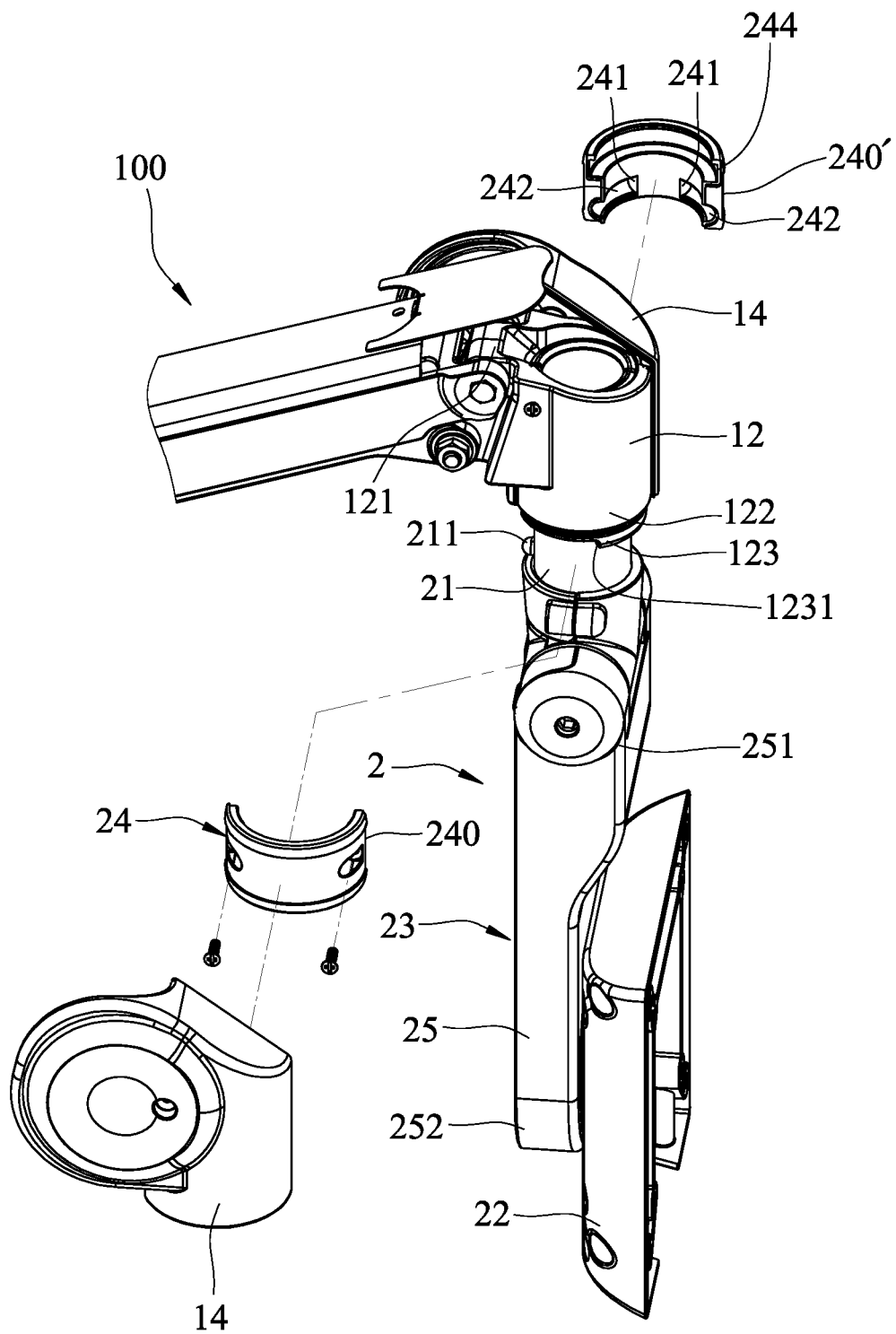
FIG. 4 is a fragmentary partly exploded perspective view of the first embodiment, illustrating a first rotary ring having a first limiting groove.
Figure 5:
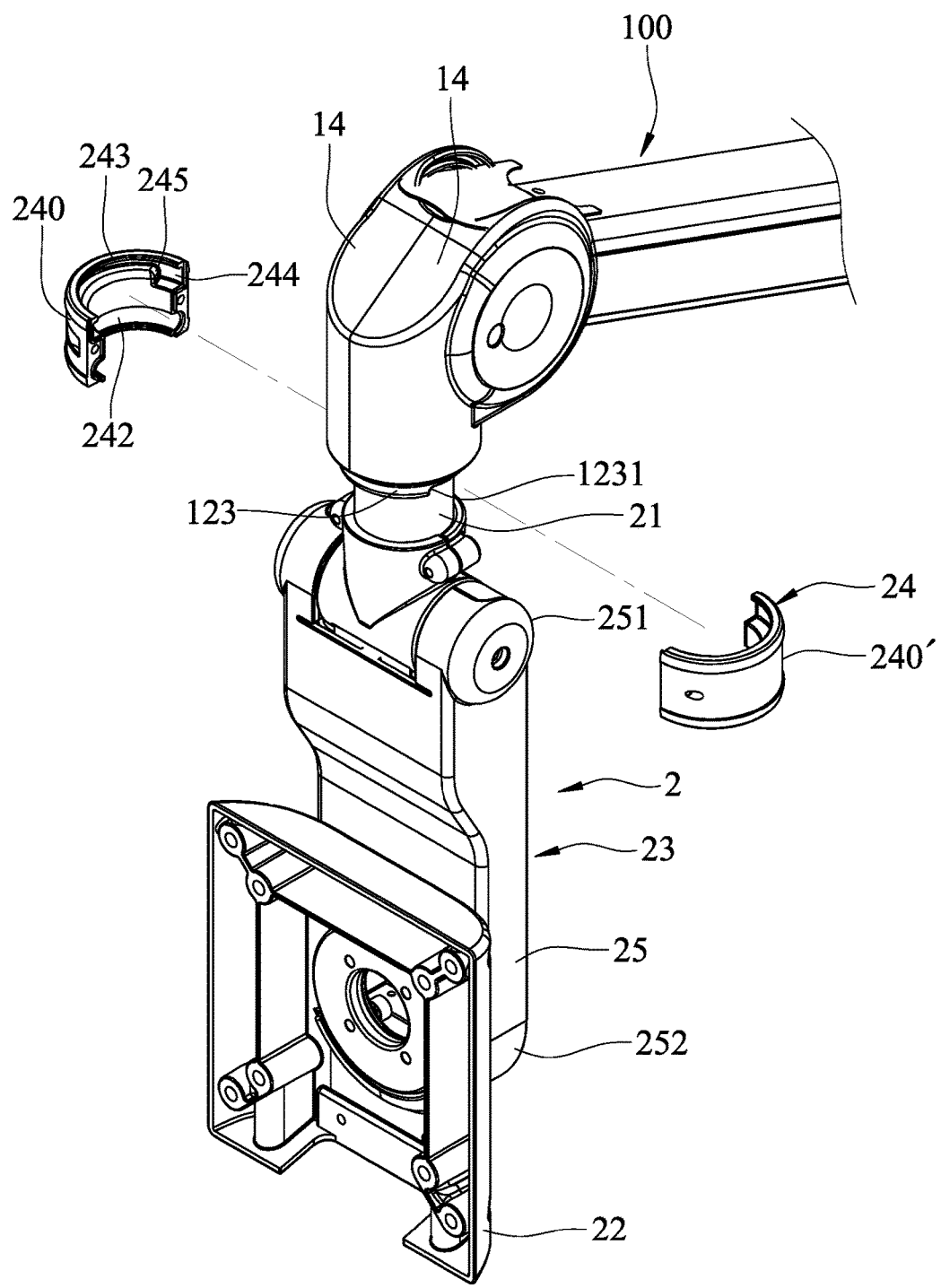
FIG. 5 is a view similar to FIG. 4, but taken from another angle.
Figure 6:
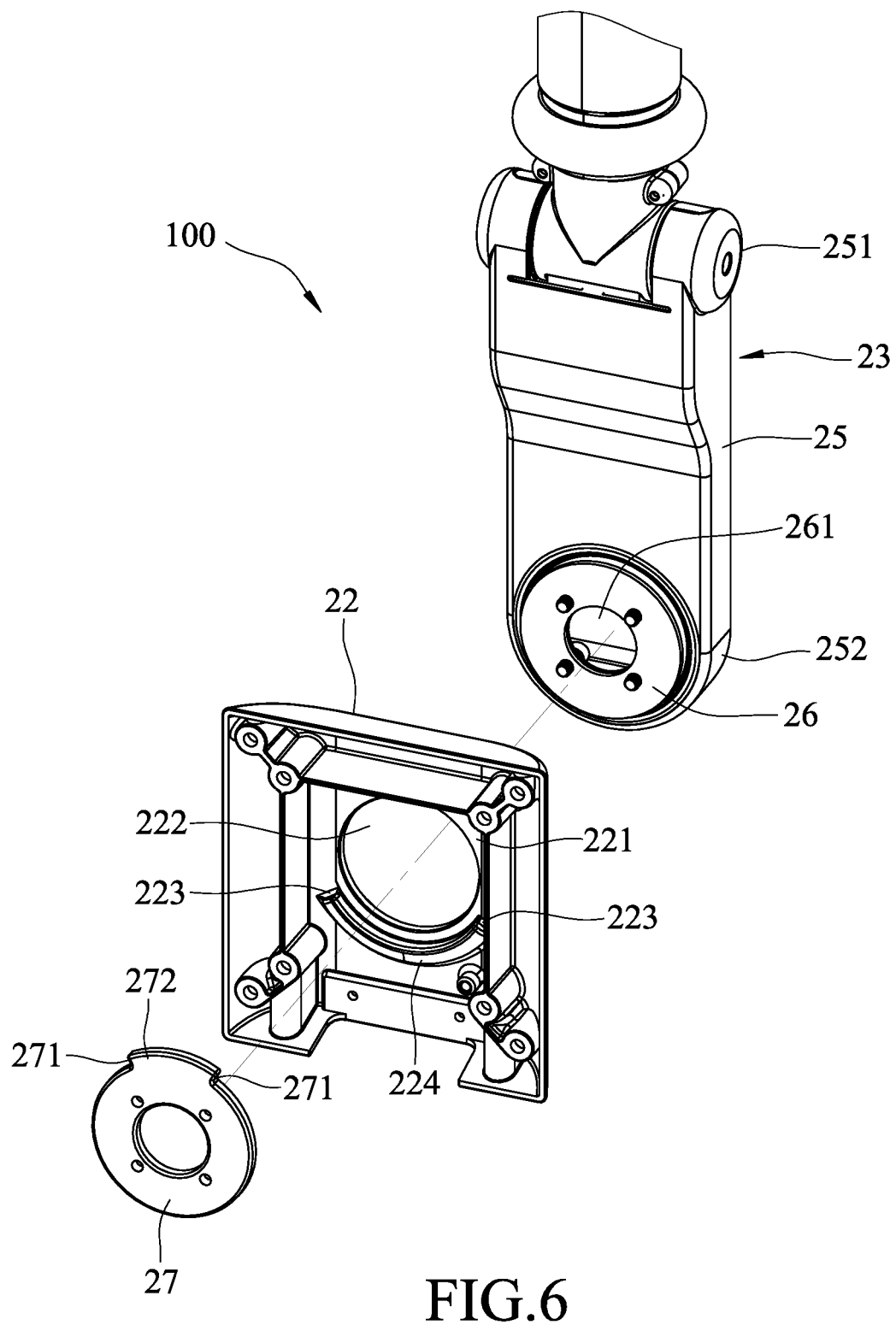
FIG. 6 is an exploded view of a wire collection box and a display mounting seat of a carrier unit of the first embodiment.
Figure 7:
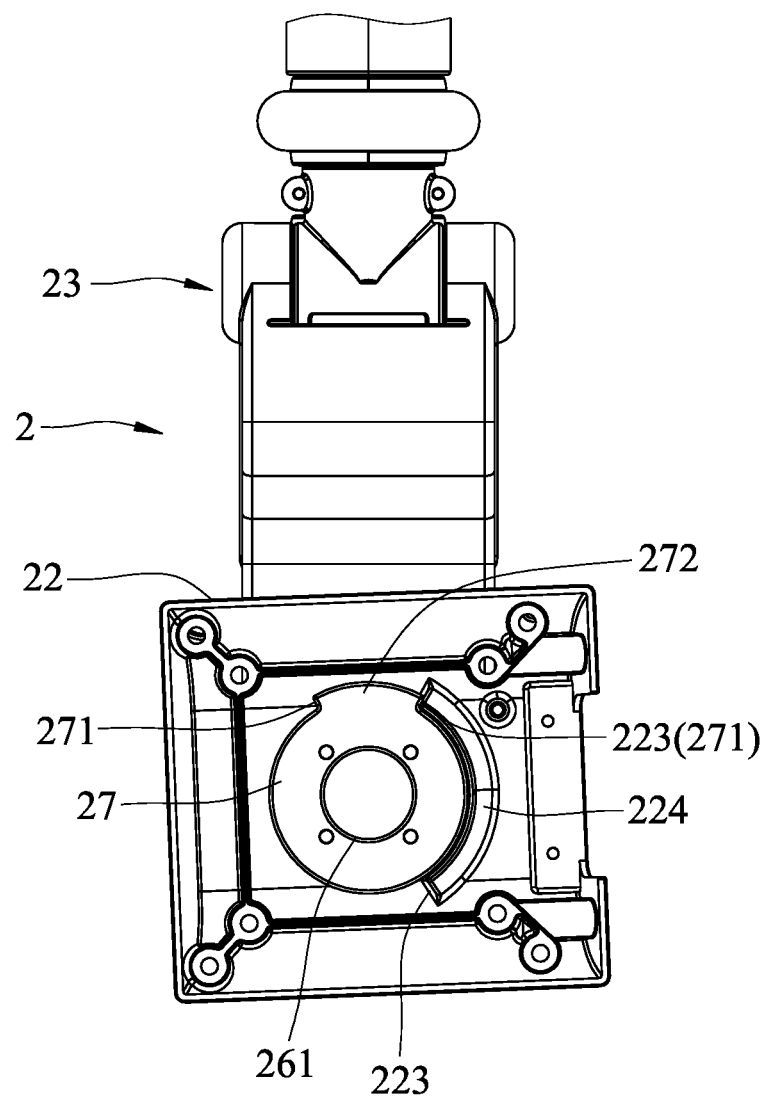
FIG. 7 is an assembled schematic view of FIG. 6.

Referring to FIGS. 6 to 11, in combination with FIGS. 1, 4 and 5, the carrier unit 2 includes a first rotary tube 21, a wire collection box 23, a display mounting seat 22, and a first rotary ring 24.

The first rotary tube 21 is rotatably inserted into the first sleeve portion 122, and has a first protrusion 211 protruding outwardly and radially from an outer surface thereof.

The wire collection box 23 is connected to the first rotary tube 21, and has a box body 25 that includes a pivot end portion 251 and a movable end portion 252 opposite to each other along the length of the box body 25, a protruding flange 26 protruding outwardly from the movable end portion 252 in a direction transverse to the length of the box body 25, and a blocking member connected to the protruding flange 26 using a plurality of screws (not shown). The pivot end portion 251 is fixed to the first rotary tube 21, and the movable end portion 252 is movable to and fro about the pivot end portion 251 (see phantom lines in FIG. 3). In this embodiment, the box body 25 defines a receiving space 253, and the protruding flange 26 has a through hole 261 communicating with the receiving space 253. The blocking member 27 is circular, and includes an arcuate blocking part 272 protruding radially and outwardly from an outer periphery thereof and having two angularly spaced-apart blocking edges 271. In addition, the wire collection box 23 further has a cover 28 for covering the receiving space 253.

The display mounting seat 22 includes a seat main body having a seat main wall 221, a through hole 222 extending through the seat main wall 221 and communicating with the through hole 261, and an arcuate positioning part 224 that is proximate to the through hole 222, that projects outwardly from the seat main wall 221 and that has two angularly spaced-apart abutment edges 223. Specifically, the display mounting seat 22 is coaxially and rotatably sleeved on the protruding flange 26 through the through hole 222, and is rotatably secured to the protruding flange 26 through engagement of the blocking member 27 with the protruding flange 26. Further, the display mounting seat 22 is connected to the first rotary tube 21 through the box body 25 at a position opposite to the first joint member 12. That is, the wire collection box 23 is connected between the first rotary tube 21 and the display mounting seat 22. In this embodiment, the diameter of the through hole 222 is sized to tightly fit on an outer diameter of the protruding flange 26. Because the display mounting seat 22 has the positioning part 224 and the blocking member 27 has the blocking part 272, and because each abutment edge 223 of the positioning part 224 is abuttable against a respective one of the blocking edges 271 of the blocking part 272, rotation of the display mounting seat 22 about the protruding flange 26 to a specific angle can be limited and stopped. Additionally, the rotation of the display mounting seat 22 to a specific angle depends upon an angular distance that the positioning part 224 can travel relative to the blocking part 272.

As shown in FIGS. 4, 5, 9 and 11, the first rotary ring 24 is sleeved on and driven by the first rotary tube 21 to rotate therealong, and is located between the first sleeve portion 122 and the pivot end portion 251 of the box body 25. The first rotary ring 24 has a first limiting groove 242, a second limiting groove 244 and an arcuate first limiting projection 243. The first limiting groove 242 is indented from and extends along an inner circumferential surface of the first rotary ring 24, and has two closed ends 241 circumferentially spaced apart from each other. The second limiting groove 244 is indented from and extends along the inner circumferential surface of the first rotary ring 24 axially spaced apart from the first limiting groove 242. The arcuate first limiting projection 243 is formed in the second limiting groove 244, and has two angularly spaced-apart abutment edges 245 (only one is visible in FIG. 5). The first limiting projection 243 and the first stopper 123 are disposed on the same plane and are coaxially rotatable relative to each other (see FIG. 11). The first protrusion 211 is slidably received in the first limiting groove 242, and is abuttable against the closed ends 241 of the first limiting groove 242 when the first rotary tube 21 is rotated relative to the first sleeve portion 122. The first stopper 123 is slidably received in the second limiting groove 244. Each abutment edge 245 of the first limiting projection 243 is abuttable against a respective one of the stop edges 1231 of the first stopper 123 when the first rotary ring 24 is driven by the first rotary tube 21 to rotate therealong. In this embodiment, the first rotary ring 24 includes two semi-circular parts 240, 240' that are screwed to each other to cooperatively form the first and second limiting grooves 242, 244 and that clamp therebetween the first rotary tube 21. The semi-circular part 240 has the first limiting projection 243.

In actual practice, when the first rotary tube 21 is driven by the box body 25 to rotate relative to the first sleeve portion 122, the first protrusion 211 thereof is slidable in the first limiting groove 242. When the first protrusion 211 abuts against one of the closed ends 241 of the first limiting groove 242, it can drive the first rotary ring 24 to rotate along with the first rotary tube 21 until one of the abutment edges 245 of the first limiting projection 243 abuts against the respective stop edge 1231 of the first stopper 123. Through this, the first rotary tube 21 can rotate more than one revolution relative to the first joint member 12. For example, when the first protrusion 211 slides 290 degrees in the first limiting groove 242, it abuts against one of the closed ends 241 of the first limiting groove 242 at this time and then drives the first rotary ring 24 to rotate 80 degrees with respect to the first stopper 123 or until one abutment edge 245 of the first limiting projection 243 abuts against the respective stop edge 1231 of the first stopper 123. Hence, the first rotary tube 21 can rotate 370 degrees relative to the first joint member 12.

Referring back to FIGS. 1, 2, 8 and 10, the positioning unit 3 includes a second rotary tube 31, a fixing seat 32, a hollow extension arm 33 and a second rotary ring 34. The second rotary tube 31 is rotatably inserted into the second sleeve portion 132, and has a second protrusion 311 protruding outwardly and radially from an outer surface thereof. The fixing seat 32 is connected to the second rotary tube 31 at a position opposite to the second joint member 13. The hollow extension arm 33 interconnects the second rotary tube 31 and the fixing seat 32. The extension arm 33 has a first end part 331 co-rotatable with the second rotary tube 31, a second end part 332 opposite to the first end part 331 and rotatable relative to the fixing seat 32, an intermediate part 333 between the first and second end parts 331, 332, and a plurality of wire collection devices 334 disposed in the intermediate part 333.

The second rotary ring 34 has a structure similar to that of the first rotary ring 24. Particularly, the second rotary ring 34 has a first limiting groove 342, a second limiting groove 344 and an arcuate second limiting projection 343. The first limiting groove 342 is indented from and extends along an inner circumferential surface of the second rotary ring 34, and has two closed ends 341 circumferentially spaced apart from each other. The second limiting groove 344 is indented from and extends along the inner circumferential surface of the second rotary ring 34 axially spaced apart from the first limiting groove 342. The second limiting projection 343 is formed in the second limiting groove 344, and has two angularly spaced-apart abutment edges 345 (see FIG. 12). The second limiting projection 343 and the second stopper 133 are disposed on the same plane and are coaxially rotatable relative to each other. The second protrusion 311 is slidably received in the first limiting groove 342, and is abuttable against the closed ends 341 of the first limiting groove 342 when the second rotary tube 31 is rotated relative to the second sleeve portion 132. The second stopper 133 is slidably received in the second limiting groove 344. Each abutment edge 345 of the second limiting projection 343 is abuttable against a respective one of the stop edges 1331 of the second stopper 133 when the second rotary ring 34 is driven by the second rotary tube 31 to rotate therealong. In this embodiment, the second rotary ring 34 includes two semi-circular parts 340, 340' that are screwed to each other to cooperatively form the first and second limiting grooves 342, 344 and that clamp therebetween the second rotary tube 31. The semi-circular part 340 has the second limiting projection 343. Because the rotation of the second rotary tube 31 relative to the second joint member 13 is similar to that of the first rotary tube 21 relative to the first joint member 12, details of the rotation of the second rotary tube 31 more than one revolution relative to the second joint member 13 are omitted herein for the sake of brevity.

Figure 13:
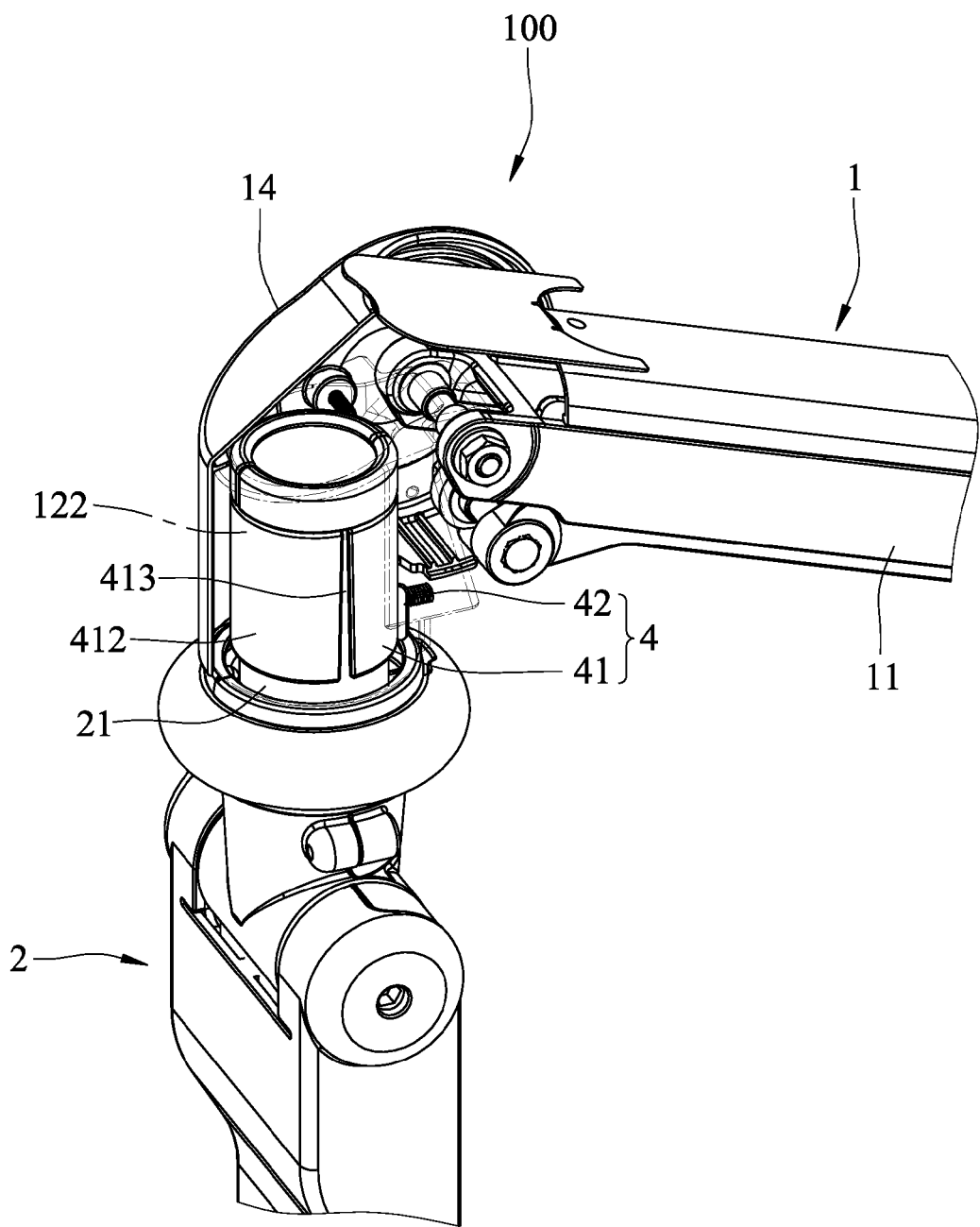
FIG. 13 is a fragmentary perspective view of the first embodiment, illustrating a first rotary tube being inserted into a tightening tube having a slit.
Figure 14:
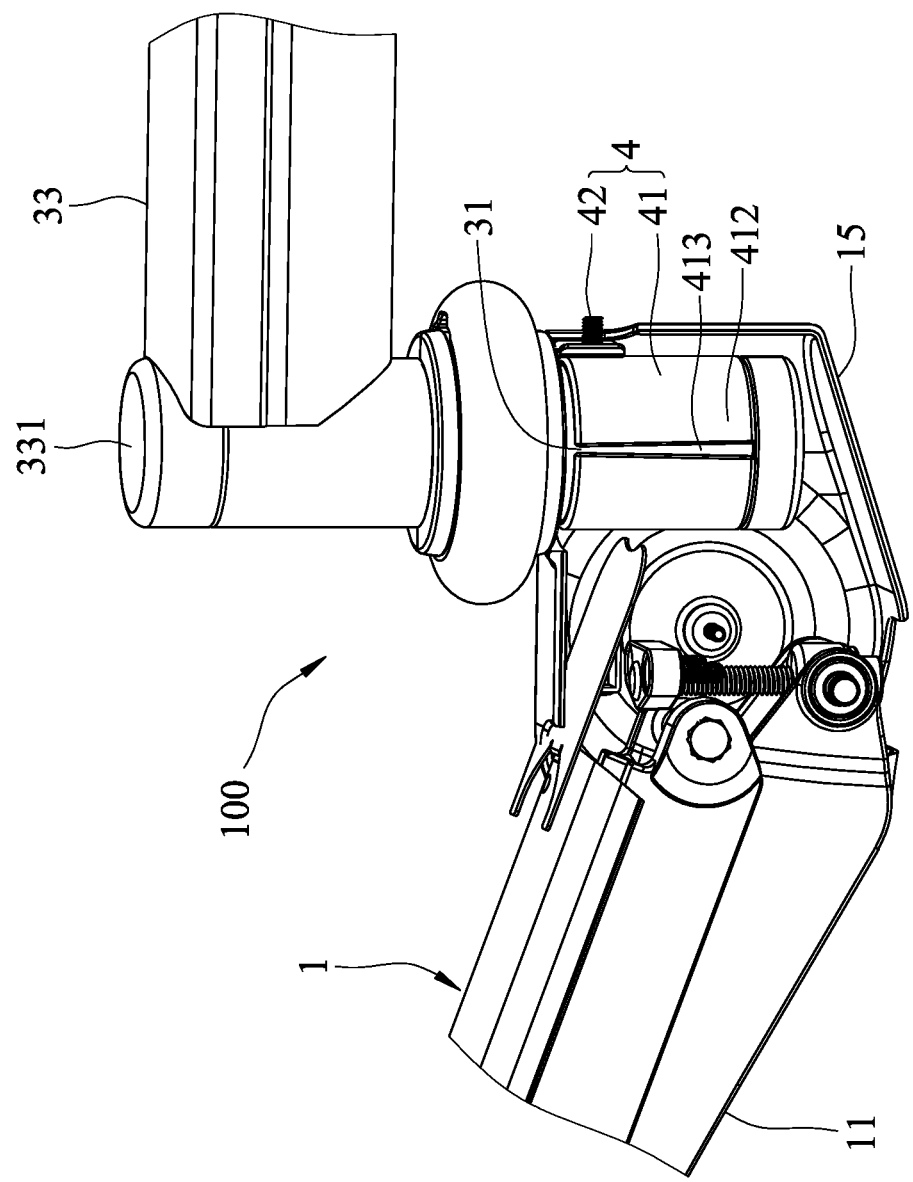
FIG. 14 is another fragmentary perspective view of the first embodiment, illustrating a second rotary tube being inserted into another tightening tube having a slit.

Referring to FIGS. 13 and 14, in combination with FIGS. 1, 2, 9 and 10, the tightening unit 4 includes two tightening tubes 41 respectively sleeved on outer peripheral surfaces of the first and second rotary tubes 21, 31, and two adjustable members 42 respectively and adjustably connected to the first and second sleeve portions 122, 132. Each adjustable member 42 is in the form of a screw that is threadedly connected to a respective one of the first and second sleeve portions 122, 132.

Each tightening tube 41 has an inner surrounding surface 411 contacting with the outer peripheral surface of a respective one of the first and second rotary tubes 21, 31, an outer surrounding surface 412 opposite to the inner surrounding surface 411, and a slit 413 formed through the inner and outer surrounding surfaces 411, 412 and extending along the length of the tightening tube 41. Each adjustable member 42 is operable to move and extend through the respective one of the first and second sleeve portions 122, 132 so as to push the outer surrounding surface 412 of a respective one of the tightening tubes 41 and adjust a width of the slit 413 of the respective tightening tube 41. Through this, a diameter of each tightening tube 41 can be changed, and each tightening tube 41 can be tightened on or loosened from the outer peripheral surface of the respective one of the first and second rotary tubes 21, 31. Each of the first and second sleeve portions 122, 132 is sleeved on the respective one of the first and second rotary tubes 21, 31 with each tightening tube 41 disposed between one of the first and second sleeve portions 122, 132 and the respective one of the first and second rotary tubes 21, 31.

Alternatively, the tightening unit 4 may include only one tightening tube 41 sleeved on the outer peripheral surface of one of the first and second rotary tubes 21, 31, and one adjustable member 42 adjustably connected to one of the first and second sleeve portions 122, 132. The purpose and effect of the tightening unit 4 may be similarly achieved.

It is worth to mention herein that the through hole 222 in the display mounting seat 22 is configured to communicate with the receiving space 253 of the wire collection box 23, an interior of the support arm 1, and an interior of the extension arm 33 so as to hide the cables of the display, so that an appealing appearance of the display support device 100 can be achieved.

To lock the display at a desired position, a user can operate each adjustable member 42 to threadedly move and extend through the respective one of the first and second sleeve portions 122, 132 so as to push and tighten each tightening tube 41 on the respective first or second rotary tube 21, 31. As such, because of the increase of the frictional resistance between each tightening tube 41 and the respective first or second rotary tube 21, 31, each of the first and second rotary tubes 21, 31 can be frictionally rotated relative to the respective first or second joint member 12, 13. When the user desires to change the position of the display again, he/she simply operates each adjustable member 42 to move threadedly away from the respective first or second sleeve portion 122, 132 so as to reduce the frictional resistance between each tightening tube 41 and the respective first or second rotary tube 21, 31. After the desired position is reached, each adjustable member 42 is operated again to threadedly move and extend through the respective first or second sleeve portion 122, 132 so as to push and tighten each tightening tube 41 on the respective first or second rotary tube 21, 31.

Figure 15:
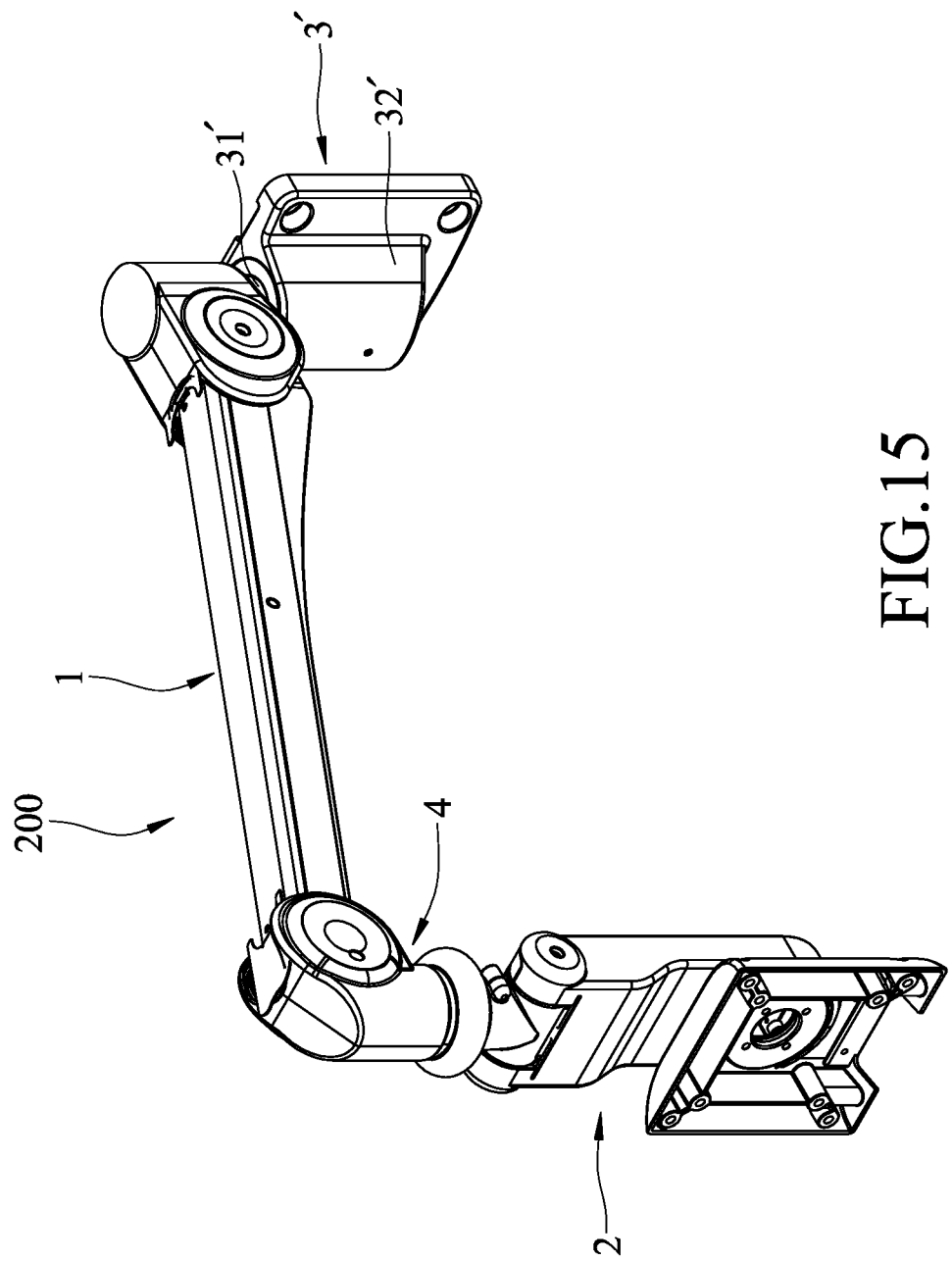
FIG. 15 is a perspective view of a display support device according to a second embodiment of the present disclosure.

FIG. 15 illustrates a display support device 200 according to a second embodiment of the present disclosure. The structure of the second embodiment is generally similar to that of the first embodiment. However, in this embodiment, the extension arm 33 of the positioning unit 3 is omitted herein, and the second rotary tube 31 is directly and rotatably inserted into the fixing seat 32. The second embodiment can achieve the same advantages and effects as those of the first embodiment.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A display support device comprising:
a support arm including an arm main body, and first and second joint members respectively pivotally connected to two opposite ends of said arm main body, said first joint member having a first pivot portion pivotally connected to one of the opposite ends of said arm main body, and a first sleeve portion connected to said first pivot portion, said second joint member having a second pivot portion pivotally connected to the other one of the opposite ends of said arm main body, and a second sleeve portion connected to said second pivot portion;
a carrier unit including a first rotary tube rotatably connected to said first sleeve portion, and a display mounting seat connected to said first rotary tube at a position opposite to said first joint member;
a positioning unit including a second rotary tube rotatably connected to said second sleeve portion, and a fixing seat connected to said second rotary tube at a position opposite to said second joint member; and
a tightening unit including at least one tightening tube sleeved on an outer peripheral surface of one of said first and second rotary tubes, and an adjustable member adjustably connected to one of said first and second sleeve portions, said tightening tube having an inner surrounding surface contacting with said outer peripheral surface of said one of said first and second rotary tubes, an outer surrounding surface opposite to said inner surrounding surface, and a slit formed through said inner and outer surrounding surfaces and extending along a length of said tightening tube, said adjustable member being operable to move and extend through said one of said first and second sleeve portions so as to push said outer surrounding surface of said tightening tube and adjust a width of said slit, thereby tightening said tightening tube on said outer peripheral surface of said one of said first and second rotary tubes,
wherein said carrier unit further includes a wire collection box connected between said first rotary tube and said display mounting seat, said wire collection box having a box body that includes a pivot end portion and a movable end portion opposite to each other along a length of said box body, a protruding flange protruding outwardly from said movable end portion in a direction transverse to the length of said box body, and a blocking member connected to said protruding flange, said pivot end portion being connected to said first rotary tube, said display mounting seat being connected to said first rotary tube through said box body, said display mounting seat being coaxially and rotatably sleeved on said protruding flange.

2. The display support device as claimed in claim 1, wherein said at least one tightening tube comprises two tightening tubes respectively sleeved on said outer peripheral surfaces of said first and second rotary tubes, and said two adjustable members respectively and adjustably connected to said first and second sleeve portions.

3. The display support device as claimed in claim 1, wherein said blocking member is circular, and includes an arcuate blocking part protruding radially and outwardly from an outer periphery thereof and having two angularly spaced-apart blocking edges, said display mounting seat including a seat main body having a seat main wall, a through hole extending through said seat main wall, and an arcuate positioning part that is proximate to said through hole, that projects outwardly from said seat main wall and that has two angularly spaced-apart abutment edges, said display mounting seat being sleeved on said protruding flange through said through hole and being rotatably secured to said protruding flange through engagement of said blocking member with said protruding flange, each of said abutment edges of said arcuate positioning part being abuttable against a respective one of said blocking edges of said blocking part when said display mounting seat is rotated relative to said protruding flange.

4. The display support device as claimed in claim 3, wherein said box body defines a receiving space, said protruding flange having a through hole communicating with said through hole of said seat main wall and said receiving space, said wire collection box further having a cover for covering said receiving space.

5. The display support device as claimed in claim 1, wherein said first joint member further has an arcuate first stopper connected to a lower end of said first sleeve portion and having two angularly spaced-apart stop edges, said carrier unit further including a first rotary ring sleeved on and configured to be driven by said first rotary tube to rotate therealong and located between said first sleeve portion and said display mounting seat, said first rotary tube having a first protrusion protruding outwardly and radially from an outer surface thereof, said first rotary ring having a first limiting groove that is indented from and that extends along an inner circumferential surface of said first rotary ring and that has two closed ends circumferentially spaced apart from each other, a second limiting groove that is indented from and that extends along said inner circumferential surface of said first rotary ring axially spaced apart from said first limiting groove, and an arcuate first limiting projection formed in said second limiting groove and having two angularly spaced-apart abutment edges, said first limiting projection and said first stopper being disposed on a same plane and being coaxially rotatable relative to each other, said first protrusion being slidably received in said first limiting groove and being abuttable against said closed ends of said first limiting groove when said first rotary tube is rotated relative to said first sleeve portion, said first stopper being slidably received in said second limiting groove, each of said abutment edges of said first limiting projection being abuttable against a respective one of said stop edges of said first stopper when said first rotary ring is driven by said first rotary tube to rotate therealong.

6. The display support device as claimed in claim 1, wherein said positioning unit further includes a hollow extension arm, said fixing seat being connected to said second rotary tube through said hollow extension arm, said hollow extension arm having a first end part co-rotatably connected to said second rotary tube, a second end part that is opposite to said first end part and that is connected to and rotatable relative to said fixing seat, an intermediate part between said first and second end parts, and a plurality of wire collection devices disposed in said intermediate part.

7. The display support device as claimed in claim 6, wherein said first joint member further has an arcuate first stopper connected to a lower end of said first sleeve portion and having two angularly spaced-apart stop edges, said carrier unit further including a first rotary ring sleeved on and driven by said first rotary tube to rotate therealong and located between said first sleeve portion and said display mounting seat, said first rotary tube having a first protrusion protruding outwardly and radially from an outer surface thereof, said first rotary ring having a first limiting groove that is indented from and that extends along an inner circumferential surface of said first rotary ring and that has two closed ends circumferentially spaced apart from each other, a second limiting groove that is indented from and that extends along said inner circumferential surface of said first rotary ring axially spaced apart from said first limiting groove, and an arcuate first limiting projection formed in said second limiting groove, said first limiting projection and said arcuate first stopper being disposed on a same plane and being coaxially rotatable relative to each other, said first protrusion being slidably received in said first limiting groove and being abuttable against said closed ends of said first limiting groove when said first rotary tube is rotated relative to said first sleeve portion, said first stopper being slidably received in said second limiting groove, two abutment edges of said first limiting projection being abuttable against a respective one of said stop edges of said first stopper when said first rotary ring is driven by said first rotary tube to rotate therealong.

8. The display support device as claimed in claim 7, wherein said second joint member further has an arcuate second stopper connected to an upper end of said second sleeve portion and having two angularly spaced-apart stop edges, said positioning unit further including a second rotary ring sleeved on and driven by said second rotary tube to rotate therealong and located between said second sleeve portion and said hollow extension arm, said second rotary tube having a second protrusion protruding outwardly and radially from an outer surface thereof, said second rotary ring having a first limiting groove that is indented from and that extends along an inner circumferential surface of said second rotary ring, that has two closed ends circumferentially spaced apart from each other, a second limiting groove that is indented from and that extends along said inner circumferential surface of said second rotary ring axially spaced apart from said first limiting groove of said second rotary ring, and an arcuate second limiting projection formed in said second limiting groove, said second limiting projection and said arcuate second stopper being disposed on the same plane and being coaxially rotatable relative to each other, said second protrusion being slidably received in said first limiting groove of said second rotary ring and being abuttable against said closed ends of said first limiting groove of said second rotary ring when said second rotary tube is rotated relative to said second sleeve portion, said second stopper being slidably received in said second limiting groove of said second rotary ring, two abutment edges of said second limiting projection being abuttable against a respective one of said stop edges of said second stopper when said second rotary ring is driven by said second rotary tube to rotate therealong.

9. The display support device as claimed in claim 8, wherein said carrier unit further includes a wire collection box connected between said first rotary tube and said display mounting seat, said wire collection box having a box body that includes a pivot end portion and a movable end portion opposite to each other along the length of said box body, a protruding flange protruding outwardly from said movable end portion in a direction transverse to the length of said box body, and a blocking member that is connected to said protruding flange, that is circular, and that includes an arcuate blocking part protruding radially and outwardly from an outer periphery thereof and having two angularly spaced-apart blocking edges, said pivot end portion being connected to said first rotary tube opposite to said first joint member, said display mounting seat including a seat main body having a seat main wall, a through hole extending through said seat main wall, and an arcuate positioning part that is proximate to said through hole, that projects outwardly from said seat main wall and that has two opposite abutment edges, said display mounting seat being sleeved on said protruding flange through said through hole and being rotatably secured to said protruding flange through engagement of said blocking member with said protruding flange, each of said abutment edges of said arcuate positioning part being abuttable against a respective one of said blocking edges of said blocking part when said display mounting seat is rotated relative to said protruding flange.

10. A display support device comprising:
a support arm including an arm main body, and first and second joint members respectively pivotally connected to two opposite ends of said arm main body, said first joint member having a first pivot portion pivotally connected to one of the opposite ends of said arm main body, and a first sleeve portion connected to said first pivot portion, said second joint member having a second pivot portion pivotally connected to the other one of the opposite ends of said arm main body, and a second sleeve portion connected to said second pivot portion;
a carrier unit including a first rotary tube rotatably connected to said first sleeve portion, and a display mounting seat connected to said first rotary tube at a position opposite to said first joint member;
a positioning unit including a second rotary tube rotatably connected to said second sleeve portion, and a fixing seat connected to said second rotary tube at a position opposite to said second joint member; and
a tightening unit including at least one tightening tube sleeved on an outer peripheral surface of one of said first and second rotary tubes, and an adjustable member adjustably connected to one of said first and second sleeve portions, said tightening tube having an inner surrounding surface contacting with said outer peripheral surface of said one of said first and second rotary tubes, an outer surrounding surface opposite to said inner surrounding surface, and a slit formed through said inner and outer surrounding surfaces and extending along a length of said tightening tube, said adjustable member being operable to move and extend through said one of said first and second sleeve portions so as to push said outer surrounding surface of said tightening tube and adjust a width of said slit, thereby tightening said tightening tube on said outer peripheral surface of said one of said first and second rotary tubes,
wherein said first joint member further has an arcuate first stopper connected to a lower end of said first sleeve portion and having two angularly spaced-apart stop edges, said carrier unit further including a first rotary ring sleeved on and configured to be driven by said first rotary tube to rotate therealong and located between said first sleeve portion and said display mounting seat, said first rotary tube having a first protrusion protruding outwardly and radially from an outer surface thereof, said first rotary ring having a first limiting groove that is indented from and that extends along an inner circumferential surface of said first rotary ring and that has two closed ends circumferentially spaced apart from each other, a second limiting groove that is indented from and that extends along said inner circumferential surface of said first rotary ring axially spaced apart from said first limiting groove, and an arcuate first limiting projection formed in said second limiting groove and having two angularly spaced-apart abutment edges, said first limiting projection and said first stopper being disposed on the same plane and being coaxially rotatable relative to each other, said first protrusion being slidably received in said first limiting groove and being abuttable against said closed ends of said first limiting groove when said first rotary tube is rotated relative to said first sleeve portion, said first stopper being slidably received in said second limiting groove, each of said abutment edges of said first limiting projection being abuttable against a respective one of said stop edges of said first stopper when said first rotary ring is driven by said first rotary tube to rotate therealong.

* * * * *